United States Patent [19]
Osthoff et al.

[11] Patent Number: 6,126,310
[45] Date of Patent: Oct. 3, 2000

[54] METHOD APPARATUS AND PACKET TRANSMISSION SYSTEM USING ERROR CORRECTION OF DATA PACKETS

[75] Inventors: Harro Osthoff, Nürnberg, Germany; Jaap Haartsen, Staffanstorp, Sweden

[73] Assignee: Telefonaktiebolaget LM Ericsson, Stockholm, Sweden

[21] Appl. No.: 08/900,830

[22] Filed: Jul. 25, 1997

[30]   Foreign Application Priority Data

Jul. 26, 1996 [DE]   Germany ............................ 196 30 343

[51] Int. Cl.⁷ .................................................. H03M 13/00
[52] U.S. Cl. ............................................... 371/35; 371/41
[58] Field of Search ............................ 371/2.1, 35, 37.7, 371/41, 37.06

[56]                 References Cited

U.S. PATENT DOCUMENTS 4,344,171   8/1982   Lin et al. ................................... 371/35
4,975,952  12/1990   Mabey et al. .............................. 380/49

FOREIGN PATENT DOCUMENTS

0290525 B1  11/1988   European Pat. Off. .
0473869 A1   3/1992   European Pat. Off. .

OTHER PUBLICATIONS

IEEE Transactions on Communications, vol. 42, No. 2/3/4, Feb. 1994, New York US; pp. 899–910 (L. Alfaro et al.)

IEEE Communications Letters, vol. 1, No. 2, Mar. 1997, pp. 49–51 (K.R. Narayan et al.)

Joachim Hagenauer, et al., "A viterbi Algorithm with Soft-Decision Outputs and its Applications", German Aerospace Research Establishment (DLR); 1989 IEEE; pp. 1680–1686.

Christiane Nill, et al., "List and Soft Symbol Output Viterbi Algorithms: Extensions and Comparisons ", IEEE Transactions on communications, vol. 43, No. 2/3/4, Feb./Mar./Apr. 1995; pp.277–287.

Dimitri Bertsekas, et al., "Point–to–Point Protocols and Links", Data Networks–Second Edition, 1987 by Prentice–Hall Inc., pp. 37–148.

Lugand et al., "Parity Retransmission Hybrid ARQ Using Rate 1/2 Convolutional Codes on a Nonsationary Channel", IEEE Transactions on Communications, vol. 37, No. 7, Jul. 1989, pp.755–765, Jul. 1989.

Deng, "New Parity Retransmission System Using Product Codes" , IEE Proceedings–I, vol. 140, No. 5, Oct. 1993, pp. 351–356, Oct. 1993.

Narayanan et al., "A Novel ARQ Technique using the Turbo Coding Principle", IEEE Communications Letters, vol. 1, No. 2, Mar. 1997, pp. 49–51, Mar. 1997.

*Primary Examiner*—Stephen M. Baker
*Attorney, Agent, or Firm*—Burns, Doane, Swecker & Mathis, L.L.P.

[57]                 ABSTRACT

The invention relates to a method, an apparatus and a packet transmission system for correcting errors in data packets (P) including information bits (IB) transmitted from a transmitter (TM) to a receiver (RC). The error correction method is characterized by the transmitter successively sending more parity bits on request of the receiver. Each set of additional parity bits is based on the original information bits, which are, however, reordered differently for each additional parity request. The receiver recursively performs a first error correction of said information bits (IB) reordered according to a first reordering pattern (REORD-A) using first parity bits (PA) for said original information bits (IB) reordered by using the same first reordering pattern, and a second error correction of said information bits (IB) reordered according to a second reordering pattern (REORD-B) using second parity bits (PB) for said original information bits (IB) reordered by using the same second reordering pattern. When no further improvement of errors is detected, a new parity bit request is transmitted to the transmitter and new additional parity bits (PC) are generated.

56 Claims, 9 Drawing Sheets

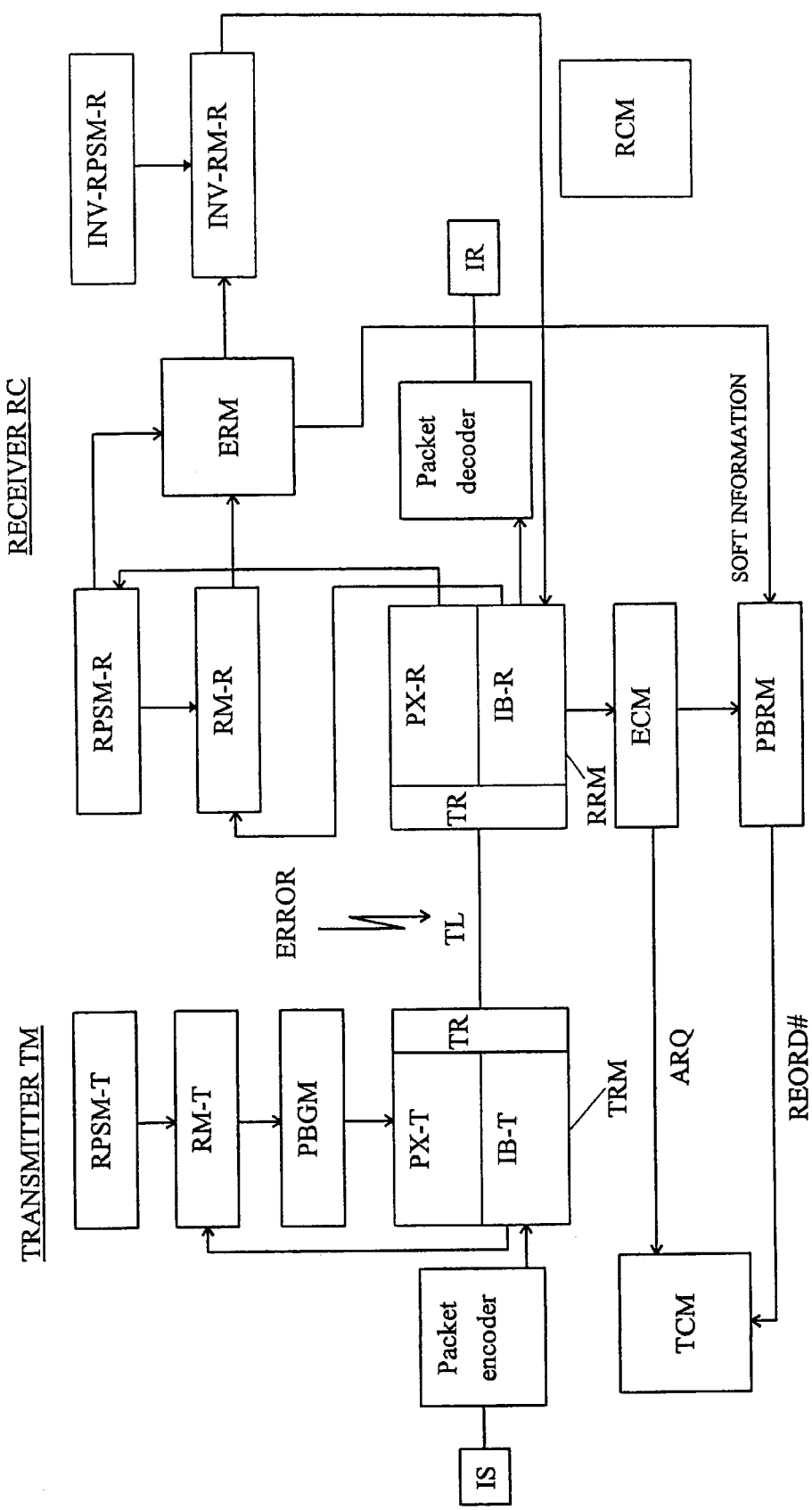
Fig. 1a: Packet transmission system with error correction

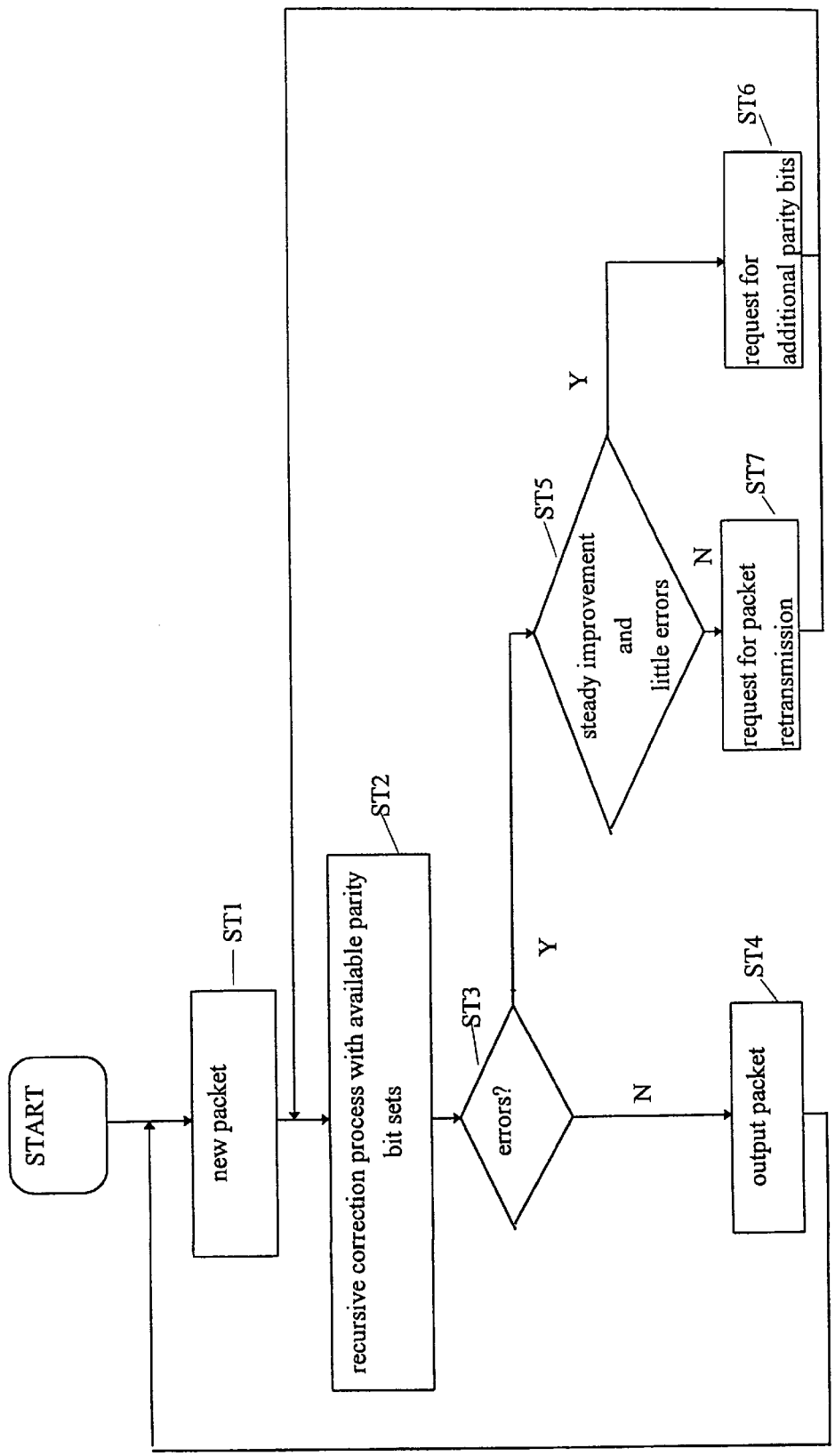
Fig. 1b: Principle flow chart of error correction method according to the invention

Fig. 2: Contents of registers RPSM-T, RPSM-R, INV-RPSM-R

RPSM-T

| # | PATTERN |
|---|---------|
| 1 | REORD-A |
| 2 | REORD-B |
| 3 | REORD-C |
|   | ....... |

RPSM-R

| # | PATTERN | PARITY |
|---|---------|--------|
| 1 | REORD-A | PA |
| 2 | REORD-B | PB |
| 3 | REORD-C | PC |
|   | ....... |    |

INV-RPSM-R

| # | INVERSE PATTERN |
|---|-----------------|
| 1 | $\overline{REORD-A}$ |
| 2 | $\overline{REORD-B}$ |
| 3 | $\overline{REORD-C}$ |
|   | ....... |

PRIOR ART
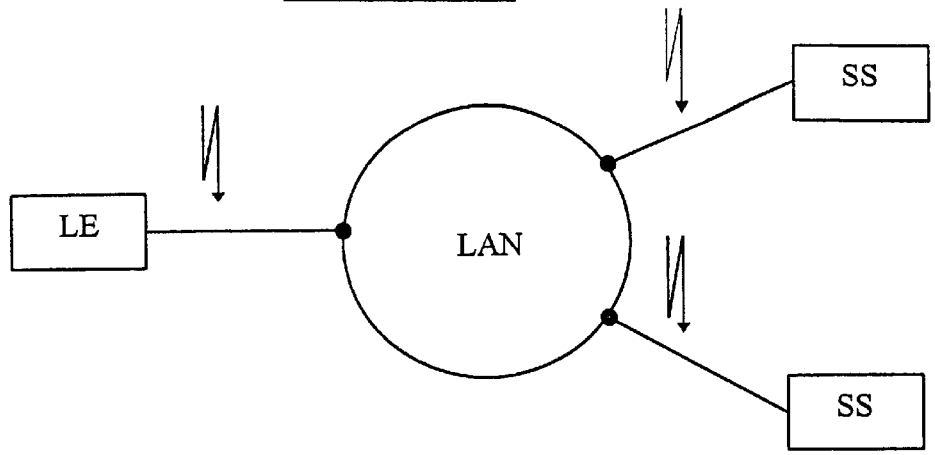
Fig. 4: Packet data transmission in local area network
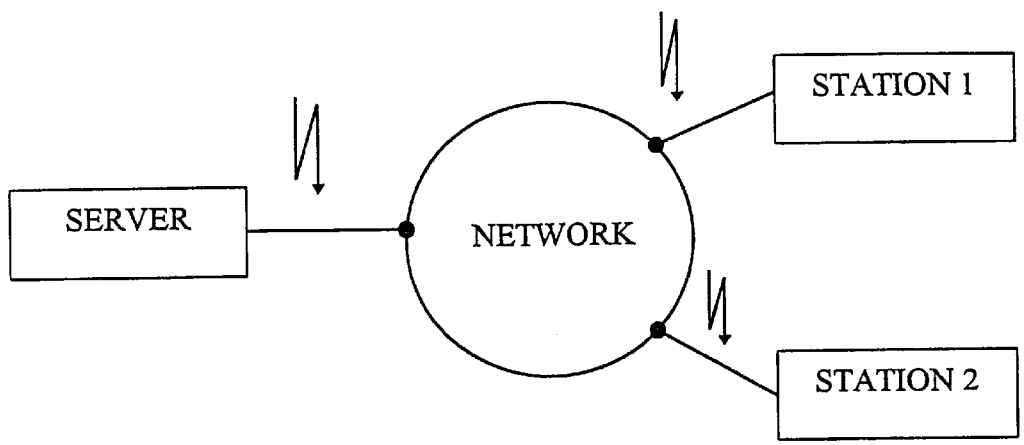
Fig. 5: Packet data transmission in computer network
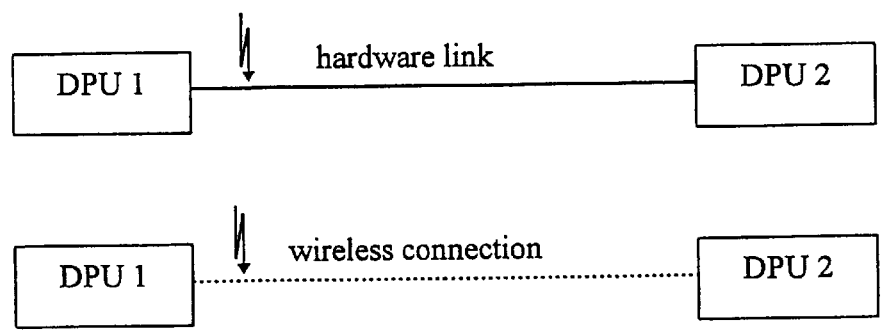
Fig. 6: Packet transmission between data processing units

PRIOR ART
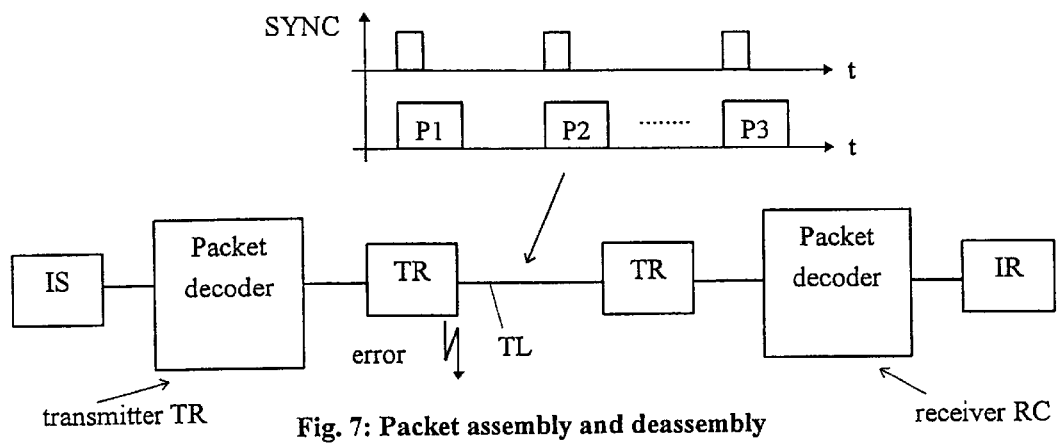
Fig. 7: Packet assembly and deassembly
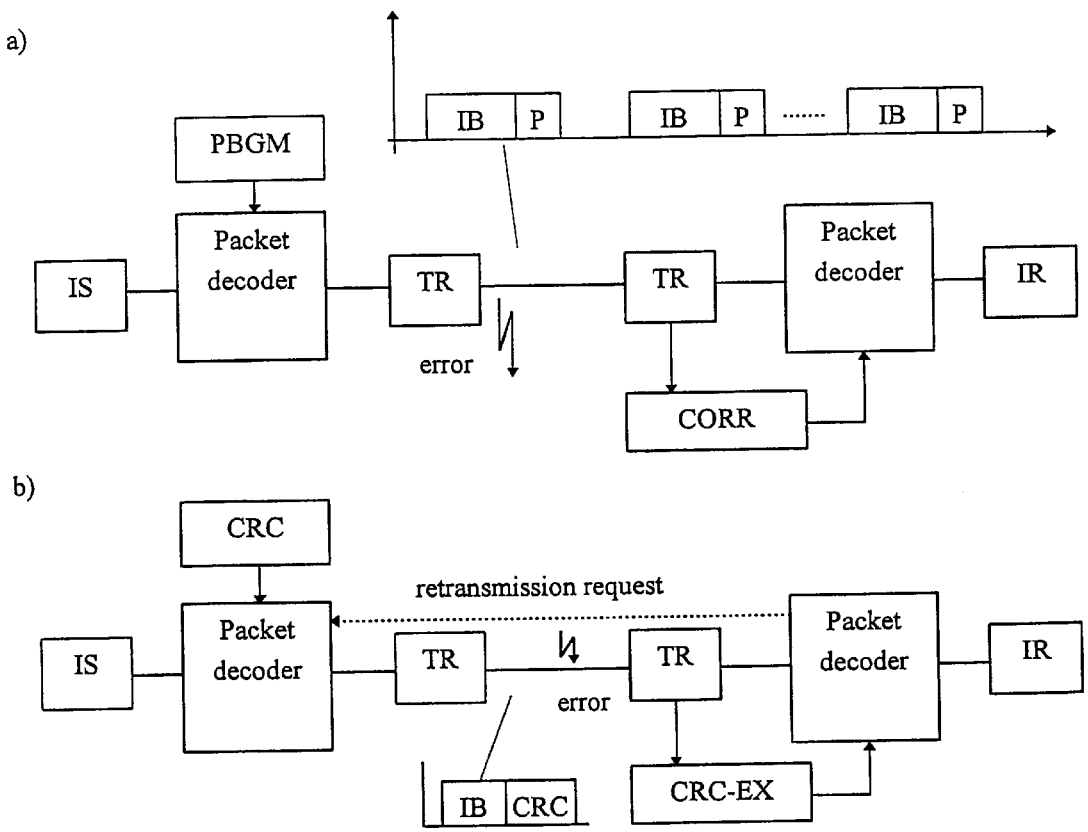
Fig. 8: Error correction techniques
 a) Forward error correction FEC
 b) Automatic repeat request ARQ

PRIOR ART
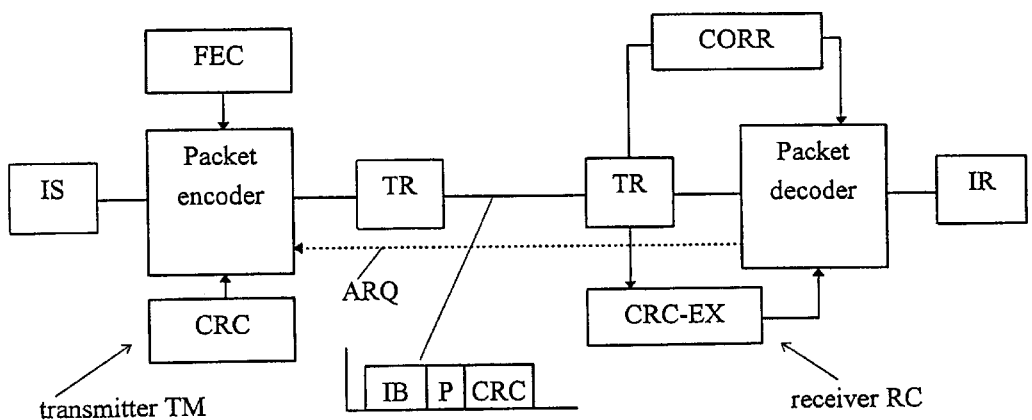
Fig. 9: Combined error correction system using FEC and ARQ techniques in GSM and D-AMPS systems

METHOD APPARATUS AND PACKET TRANSMISSION SYSTEM USING ERROR CORRECTION OF DATA PACKETS

FIELD OF INVENTION

The invention relates to a method, an apparatus and a packet transmission system that use an error correction technique for correction errors in data packets transmitted from a transmitter to a receiver via a transmission link. Such an error correction method, an apparatus for error correction and a packet transmission system using such an error correction find broad applications in general communication systems. For example, packet data transmission is used in a local area network LAN for connecting individual subscribers SS to a local exchange LE (FIG. 4). Likewise, packet data transmission may be used in computer networks for interconnection of several stations 1, 2, e.g. computer terminals, to a server via a network (FIG. 5). In general, data transmission between two data processing units DPU1, DPU2 may also use packet data transmission over a hardware link or a wireless connection (FIG. 6).

In all such systems as shown in FIGS. 4 to 6, the original information is decoded into individual packets, comprising payload information bits. However, it is almost unavoidable, that on the interconnection link errors occur, that destroy or distort part of the information bits of the individual packets (in the drawings such an error is indicated by an arrow). It is mostly the interconnection link itself, which is not error-free, especially, if the interconnection is a wireless connection, which are particularly prone to accumulate errors.

BACKGROUND OF THE INVENTION

As is shown in FIG. 7, usually data communication that requires error-free delivery is transmitted in packet format, i.e. the information message output by an information source IS is segmented in a packet encoder and each segment is transmitted in an individual data packet P1, P2, P3 onto a transmission link TL via a transmitter/receiver TR. On the receiver side, there is a packet decoder that performs the reassembly of the packets into the original information message to be forwarded to the information receiver IR. Such packet segmentation is very general and may be performed asynchronously on the transmission link TL. It can, however, also be a synchronous packet transmission system, as is schematically indicated with the SYNC-pulse in FIG. 7. Such a segmentation of the information message in individual data packets P1, P2, P3 has the main advantage that only the segment or packet that contains the error has to be considered, not the entire message.

In order to allow an error correction of individual packets, there are a variety of error coding and error correction techniques used. FIG. 8 shows the most common error correction techniques, namely a forward error correction FEC and an automatic repeat request technique ARQ. As is shown in FIG. 8a, the information bits IB of the individual packets are supplemented with parity bits P, which are generated by a parity bit generation means PBGM cooperating with the packet encoder. The extra parity bits help the packet decoder to locate and correct the errors. That is, a corrector CORR checks the parity bits P and advises the packet decoder on the errors. The packet decoder then takes this information into account for a correction and decoding of the packet.

In the automatic repeat request technique ARQ (see e.g. EP 0 290 525 B1 or EP 0 473 869 A1), the receiver RC only checks whether the information bits in the received packet are correct (the checking is done with conventional error checking algorithms, e.g. see D. Bertsekas, and R. Callager, DATA NETWORKS, 2nd edition, chapter 2, Prentice-Hall, London 1992). If not, it requests the transmitter for a retransmission of the packet. As is shown in FIG. 8b, some information is added to the packet, called the cyclic error check CRC message which is unique for the packet information. When the CRC extraction means CRC-EX extracts this CRC-information, the packet decoder can decide whether the packet is correct or not. That is, if the information is distorted due to errors, the CRC-information changes, which indicates to the CRC extraction means CRC-EX that an error has occurred during the transmission of the packet.

However, generally both FEC and ARQ techniques reduce the throughput, i.e. the possible number of data packets per unit time. That is, in the FEC-technique extra parity bits P are added to the information bits IB, such that more time is necessary for the transmission of such packets. In the automatic repeat request ARQ technique, the retransmission reduces the throughput.

It can be seen that obviously the two afore-mentioned error correction methods reduce the throughput differently. The FEC reduces the throughput with a constant factor, since it will always add the parity bits (with constant length) independent of the fact whether there are actually errors on a link or not. By contrast, the retransmissions in the ARQ technique only occur, when the link experiences errors and therefore, the throughput adapts to the error environment.

Since with the ARQ technique a retransmission is applied, if there is one or more errors, it can be very disadvantageous in a situation where the error rate is small, but high enough to affect each packet. In order to find a balance between the advantages and disadvantages of the afore-mentioned two techniques, a combination may also be applied: a light amount of FEC adds little overhead, but can be helpful to correct packets, which are only lightly affected by errors. In this situation, the FEC-technique will reduce the number of retransmissions.

Therefore, a combined system of FEC and ARQ-techniques have already been suggested, as is shown in FIG. 9. An example is a data communication carried out with the current GSM-system and the D-AMPS-system. Here, the data is run through a channel encoder (packet encoder) and a channel decoder (packet decoder), but a higher layer protocol is provided that takes care of the ARQ-technique.

However, even the combined system of FIG. 9 has disadvantages, since such a system does not make use of the accumulated information received. When a packet is still not correct after a FEC-decoding, an entire retransmission of not only the information bits but also the parity bits is necessary. Then again, the retransmitted packet is decoded by itself and checked, and a further retransmission request is issued, if it is not correct.

Alternatively, in a more efficient scheme, the old, rejected packet is not discarded, when a retransmission of the original packet arrives at the receiver, such that both the information in the old and the new packet can be used. If more retransmissions are required, all the information of the old packet should be accumulated and all be used in the decoding process in the packet decoder. In an extreme case, it could even be envisaged that not the packet itself is to be transmitted, but only extra parity bits that can help improve the error correction of the receiver.

Another method for such a combined system is to use so-called punctured codes and to send the receiver subsequently the withheld parity bits, only when required.

Obviously, the combined FEC/ARQ-system has advantages, since it only requests a retransmission of a packet, if some basic correction of errors with the forward error coding technique cannot be obtained. Furthermore, only extra parity bits need be retransmitted in order to improve the error correction at the receiver. Since the combined FEC/ARQ-system only uses the information bits of the original packet, the information bits of the retransmitted packet and possibly further parity bits, the error correction in the receiver ends, when all this combined information has been used for the error correction. Then, no further improvement of error correction can be performed even if there are still further errors in the transmitted packet. Furthermore, the retransmission of information bits of the packet is disadvantageous in any case, since it drastically reduces the throughput.

SUMMARY OF THE INVENTION

Therefore, the underlying object of the invention is to provide an error correction method, an error correction apparatus and a packet transmission system, that use the advantages of the combined FEC/ARQ-techniques for error correction, but result in a high throughput and an improved error correction.

One aspect of the invention lies in a method for correcting information bits of a data packet, which have been subjected to errors due to a transmission of said data packet between a transmitter and a receiver, wherein a) the original information bits of said data packet before transmission are reordered at said transmitter using a selected reordering pattern in response to a parity bit request issued by said receiver;

b) a set of parity bits for said reordered original information bits are derived and transmitted by said transmitter to said receiver;

c) said erroneous information bits received at said receiver are reordered using said selected reordering pattern; and d) said reordered erroneous information bits are corrected at said receiver using said set of parity bits received from said transmitter.

Another aspect of the invention lies in a packet transmission system for data packet transmission and for error-correction of data packets having erroneous information bits due to errors caused on a transmission link between a data packet transmitter and a data packet receiver, said transmitter comprising:

a1) a transmitter reordering means for reordering the original information bits of said data packet before transmission using a selected reordering pattern in response to a parity bit request transmitted by said receiver; and a2) a parity bit generation means for generating a set of parity bits for said original information bits reordered by said transmitter reordering means; and said receiver comprising:

b1) a parity bit request means for transmitting a parity bit request to said transmitter;

b2) a receiver reordering means for reordering said received erroneous information bits of said transmitted data packet using said selected reordering pattern; and b3) an error correction means for error correction said reordered erroneous information bits using said set of parity bits received from said transmitter.

A further aspect of the invention lies in an apparatus for correcting errors in data packets having erroneous information bits due to errors caused on a transmission link between a data packet transmitter and a data packet receiver, comprising:

a) a parity bit request means for transmitting a parity bit request to said transmitter;

b) a reordering means for reordering said received erroneous information bits of said transmitted data packet using a selected reordering pattern; and c) an error correction means for error correction of said erroneous information bits reordered by said reordering means using a set of parity bits being generated at and transmitted from said transmitter for said original information bits reordered according to said selected reordering pattern in response a parity bit request issued by said parity bit request means.

In such a method, data packet transmission system and apparatus according to the invention, new parity information is generated in the transmitter, each time the receiver requests for additional parity bits to correct erroneous bits. Such new parity bits are obtained by reordering the information bits prior to deriving the parity bits. When receiving the newly derived parity bits, the receiver performs a reordering of the corrected information bits according to the same reordering scheme, which was used in the transmitter. The reordering of information bits is a fixed process (but has a different pattern for each additional parity request). The reordering pattern, which is used in the transmitter in order to derive new parity bits, is the same which the receiver uses for reordering before a correction is performed.

When performing the reordering using the selected reordering and inverse reordering pattern in connection with the correction of the information bits with new parity bits, the receiver can successively use information derived from the original information bits, without a complete retransmission of the information bits being necessary. All that is necessary is to make the reordering in the transmitter and receiver coherent by using the same reordering pattern and to transmit the respectively newly derived parity bits. Thus, a smaller number of bits have to be retransmitted to the receiver for further error correction. However, the receiver can successively accumulate information that it can use for the error correction process. This results in an improved error correction and the throughput speed of packets is only reduced in cases, when parity bits are transmitted for further error correction.

When performing an error correction of information bits, the error correction means in the receiver can advantageously derive so-called soft information which indicates the reliability of error correction for the corrected set of information bits. When no further error improvement in the receiver is detected and a request for new parity bits is made from the receiver, the parity bit request means can advantageously use this soft information indication for not only sending to the transmitter the parity bit request itself, but also—on the basis of the soft information—an indication as to which reordering pattern should be used next in the transmitter for the derivation of such new parity bits. This will in general be a reordering pattern, in which the still erroneous bits are spaced as far from each other as possible (so that many "good" bits surround each "bad" bit). Thus the error correction speed and accuracy can be increased.

During the recursive reordering and correction in the receiver, the receiver uses successively a reordering pattern and an inverse reordering pattern, whereby the respectively used parity bits for the error correction are associated to the reordering/inverse reordering patterns. The transmitter/ receiver can perform a reordering and inverse reordering respectively by only using one reordering and inverse reordering pattern. When more than two sets of parity bits are available, it is also possible to respectively use several reordering patterns successively in the recursive performing of reordering and correction.

Advantageously, the error correction means in the receiver can perform a correction of the parity bits at the same time when correcting the erroneous information bits.

In another aspect of the invention, it is also possible, that the receiver makes a multiple parity bit request that requests the derivation of several sets of parity bits for all reordering patterns (or for the remaining ones, when some of sets parity bits have been derived already in previous single parity bit requests) present in the receiver reordering pattern storage means. All these parity bits are then transmitted as a next data packet to the receiver and are subsequently assigned to the respective reordering patterns in the receiver reordering pattern storage means.

Further advantageous embodiments and improvements of the invention can be taken from the dependent claims. Hereinafter, the invention will be illustrated with reference to its advantageous embodiments and the accompanying drawings.

BRIEF DESCRIPTION OF THE DRAWINGS

FIG. 1a shows a packet transmission system and an apparatus for error correction of data packets according to an embodiment of the invention;

FIG. 1b shows a principle flow chart of the error correction method according to the invention;

FIG. 2 shows the contents of the reordering pattern storage means RPSM-T, RPSM-R provided in the transmitter TM and the receiver RC shown in FIG. 1;

FIG. 4 shows a prior art packet data transmission system for use in a local area network;

FIG. 5 shows a prior art packet data transmission system used in a computer network;

FIG. 6 shows a prior art packet data transmission system used between two data processing units;

FIG. 7 shows the packet assembly and reassembly in the data packet transmission system;

FIGS. 8a, 8b respectively show the forward error correction FEC-technique and the automatic repeat request ARQ-technique; and FIG. 9 shows a prior art combined error correction system using FEC and ARQ-techniques, e.g. in a GSM and D-AMPS-system.

BEST MODE FOR CARRYING OUT THE INVENTION

Figure 3A:
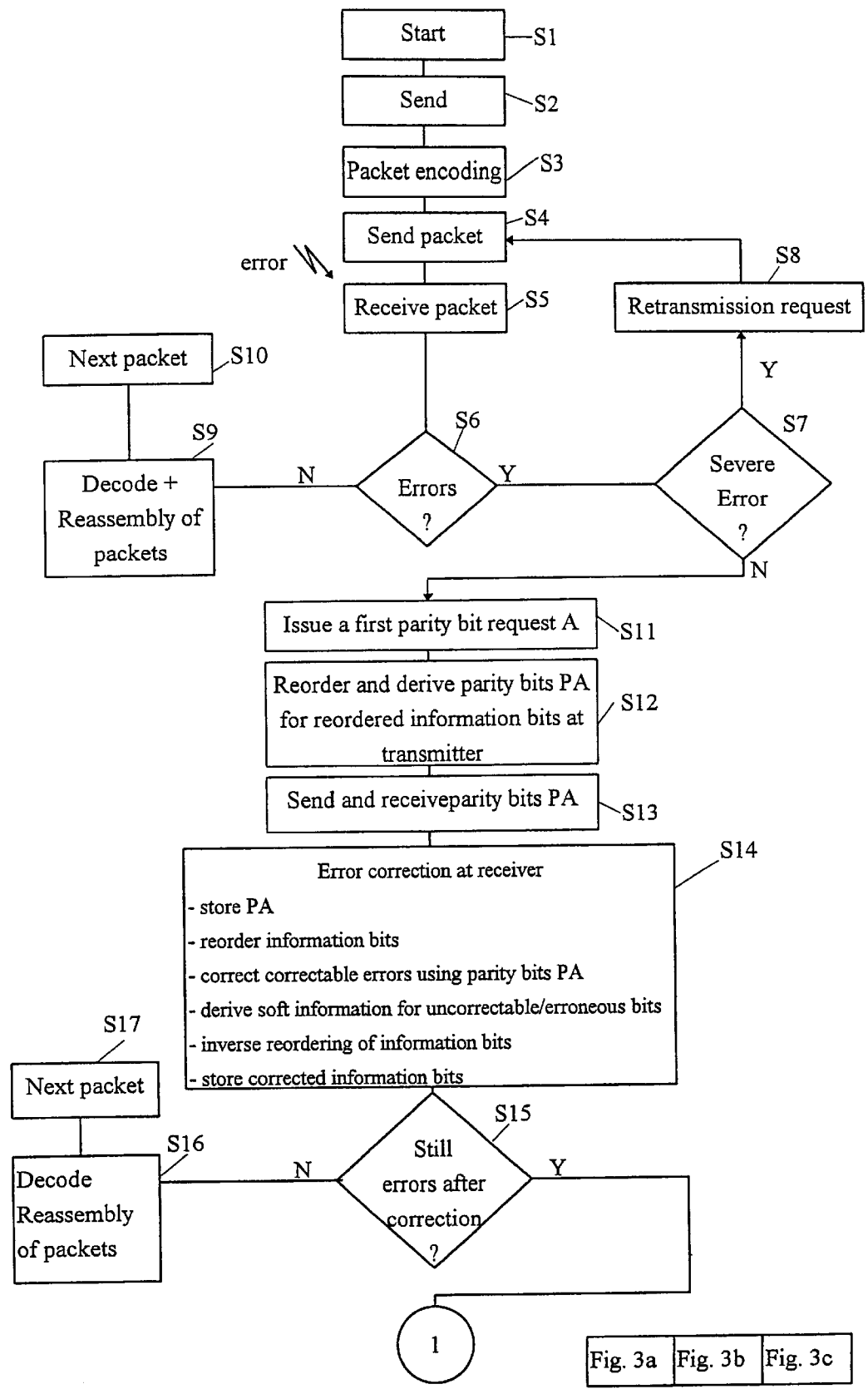
FIGS. 3a, 3b, 3c in combination show a detailed flow chart according to an embodiment of the error correction method of the invention carried out in the system and apparatus shown in FIG. 1, 2 for the case of a recursive error correction using up to 3 parity bit requests.

In the following description, the same reference numerals as in FIGS. 4 to 9 are used to designate the same or equivalent parts throughout the description. FIG. 1 shows a packet transmission system having a transmitter TM and a receiver RC, which incorporates an apparatus for error correction according to an embodiment of the invention.

An information source IS generates an information message, which is segmented by the packet encoder into individual packets including information bits IB. Since in the invention additional parity bits will be requested by the receiver RC for error correction, parity bits PA, PB, PC (generally also denoted as PX hereinafter) and information bits IB are strictly separated. That is, for an encoding of the information message in data packets there is used a systematic code, which is employed for correcting the erroneous information bits with parity bits in the receiver using a FEC-technique.

The transmitter register means TRM consists of two registers IB-T and PX-T for storing the original information bits IB and parity bits PX, which are generated by a parity bit generation means PBGM. Information bits IB and parity bits PX are transmitted by a transmission side transmission means TR onto the transmission link TL, received by a respective transmission/reception means TR on the receiver side and stored in a register IB-R and a register PX-R respectively in a receiver register means RRM. Received parity bits PX from said register PX-R are further supplied to a receiver side reordering pattern storage means RPSM-R. The packet decoder reassembles the information bits of the packet contained in the IB-R register into the original information message, which is then output to the information receiver IR.

The information bits IB in said information bits register IB-R will always be ordered in the original order in which they have been transmitted originally from the transmitter TM. During the error correction process they will be overwritten with (multiple) corrected information bits, which however always possess the original ordering. In an alternative embodiment, the receiver information bit register IB-R can however store also the intermediate results of the iteration process, for statistic purposes or to be displayed to a user on a display screen for verification purposes.

The parity bits PX in said receiver parity bit register PX-R are always the last received parity bits generated at and transmitted from the transmitter TM for the original information bits or—as will be explained below—for the original information bits which have been appropriately reordered in the transmitter TM.

The receiver RC further comprises an error check means ECM, which performs an error check algorithm on the original or multiple corrected information bits IB stored in the register IB-R of the receiver register means RRM over time. When errors are detected by the error check means ECM, the parity bit request means PBRM can issue a parity request, which is transmitted to the transmitter control means TCM, which in turn controls the parity bit generation means PBGM to generate parity bits PX for a set of information bits provided by the transmitter reordering means RM-T.

Furthermore, if the error check means ECM detects too many errors, when the packet of information bits is transmitted by the transmission means TR and received in the receiver RC for the first time, it can output an automatic retransmission request ARQ to the transmitter control means TCM, which then controls the transmission means TR to perform a complete retransmission of the original data packet. An automatic retransmission request ARQ can also be issued when during the process of parity requests and error correction the improvements appear to be too slow or negligible.

An error correction means ERM performs an error correction of information bits provided by the receiver reordering means RM-R. The error correction means ERM performs an error correction of such information bits by using parity bits transmitted from the transmitter and provided to ERM by the receiver reordering storage means RMSM-R. The error correction means ERM corrects correctable errors in these information bits using such parity bits and advantageously generates soft information as is indicated in FIG. 1.

This soft information indicates the reliability of the information bits which have been corrected. For example, the soft information (J. Hagenauer, P. Höher, "A Viterbi algorithm with soft-decision outputs and its application", Proc. IEEE Globecom '89, Dallas Tex., November 1989, pp. 1680–1686; C. Nill, C.-E. Sundberg, "List and Soft Symbol Output Viterbi Algorithms: Extensions and Comparisons", IEEE Transactions on Communications, vol. 43, no. 2/3/3, February, March, April 1995) indicates the probability that certain bits in the error-corrected set of information bit are still erroneous or "bad". Thus, the soft information provides information as to how certain or uncertain the error correction means ERM views its result for the individual information bits.

The parity request means PBRM can use this soft information when it issues a parity bit request to the transmitter control means TCM. That is, it can indicate to the transmitter control means TCM a specific number REORD# of a reordering pattern to be used next for the reordering of information bits on the basis of an indication of such soft information. REORD# can also be used to selectively indicate several numbers of reordering patterns to be used next, namely when the receiver wants to have transmitted in one common data packet several sets of parity bits for several sets of reordered information bits, each set having been reordered according to one of the reordering patterns indicated by REORD#. Thus, REORD# can also indicate that in a next common data packet all sets of parity bits corresponding to all reordering patterns are to be transmitted. On the other hand, when REORD# contains no specific number at all, it only contains the mere request for a new set of parity bits and hence the next in line of the reordering patterns stored in RPSM-T will be used for the generation of the parity bits, as will be further explained below.

The transmitter TM and receiver RC respectively comprise a reordering means RM-T, RM-R and a reordering pattern storage means RPSM-T, RPSM-R. FIG. 2 shows the contents of the registers RPSM-T, RPSM-R. RPSM-T, RPSM-R contain a list of fixed and identical reordering patterns REORD-A, REORD-B, REORD-C etc. each associated with a respective number #. RPSM-R has stored the same numbered reordering patterns as does RPSM-T, but in addition there is an entry for the corresponding parity bits PA, PB, PC. PA, PB, PC are initially not set, but they are generated and transmitted by the parity bit generation means PBGM and the transmitter transmission means TR upon a parity bit request made by the parity bit request means PBRM of the receiver. PA, PB, PC are only valid for the current packet of information bits and thus the parity bit storage entries in the RPSM-R are updated for each new packet generated by the packet encoder. With the identical storage of reordering patterns in RPSM-T, RPSM-R it is ensured that the reordering means RM-T, RM-R respectively use the same reordering pattern for reordering information bits when a new request for parity bits is made.

An inverse reordering pattern storage means INV-RPSM-R in the receiver RC stores the inverse of the respective reordering patterns of RPSM-T, RPSM-R. The inverse reordering patterns $\overline{\text{REORD-A}}$, $\overline{\text{REORD-B}}$, $\overline{\text{REORD-C}}$ etc. are again each associated with a respective number #. A receiver inverse reordering means INV-RM-R uses these inverse reordering patterns for an inverse reordering of a set information bits corrected by the error correction means ERM and overwrites the receiver information bit register IB-R with such error corrected inverse reordered information bits, as will be further explained below in detail.

Instead of using a storage of inverse reordering patterns in INV-RPSM-R, an inversion means within the inverse reordering means INV-RM-R can also generate the inverse reordering patterns by inverting the reordering patterns stored in RPSM-R when needed for an inverse reordering of information bits. A receiver control means RCM controls the overall operation of the individual means in the receiver RC.

In a packet transmission system according to FIG. 1, the packet encoder performs a segmenting and encoding of the information message from the information source IS into a packet, which contains information bits, which are as explained above, stored in the transmission register means TRM. Various techniques for the packet encoding may be used as is known in the prior art. The invention is not restricted to any particular use of packet encoding scheme, as long as packets with individual information bits are provided. The reordering of information bits can be seen analogous to the reordering of information bits in the known Turbo-coding technique. That is, a particular reordering pattern will be applied to the information bits, to yield new information bits in different order.

The packet transmission system shown in FIG. 1a basically carries out an error correction method as principally shown in the flow chart of FIG. 1b. In step ST1, a new data packet including original information bits is transmitted from the transmitter TM to the receiver RC. When the packet after transmission over the transmission link TL is first received by the receiver RC, the data packet can either contain a set of parity bits PA (either derived for the originally encoded information bits or already for the originally encoded information bits reordered according to a first reordering pattern) or no parity bits at all. Since at this initial stage in step ST2 no parity bits or at the most one single set of parity bits is available, the error correction means ERM can either perform an initial error correction of the received information bits or no error correction at all. No recursive error correction is possible at this initial stage, since at the most one single set of parity bits is available at the receiver RC. When no errors are detected by the error check means ECM in step ST3, the received information bits are decoded into a packet in step ST4, whereafter the transmission of the next packet takes place.

When errors are detected in step ST3 and no improvement or many errors are asserted in step ST5, then a complete retransmission of the packet is requested in step ST7. However, if there is a steady improvement or only little errors experienced in step ST5, then the parity bit request means PBRM can request additional parity bits in step ST6. In response to the parity bit request, the transmitter reorders the original information bits using a selected reordering pattern and sends parity bits for these reordered information bits to the receiver.

Thereafter, in step ST2, an error correction is carried out at the receiver by reordering the received information bits according to the same selected reordering pattern and using the received parity bits generated by the transmitter. If at this stage, there are already present in total two sets of parity bits, then a recursive correction process with the available parity bit sets can be carried out in step ST2. If not, the operation goes again through ST3, ST5, ST6 until at least two sets of parity bits are available in ST2.

In the recursive correction process, the information bits are respectively reordered using a selected reordering pattern, corrected with the parity bits associated with said selected reordering pattern and inversely reordered by using an inverse of said selected reordering pattern. This is done alternately by using the at least two sets of parity bits and their associated reordering patterns (and inverse reordering patterns) until no further improvement of errors in this recursive scheme can be detected. If there are still errors after the recursive error correction in ST3, further parity bits can again be requested in step ST6.

Thus, the error correction method is characterized by the transmitter successively sending more parity bits on request of the receiver, wherein each set of additional parity bits is based on the original information bits, which are, however, reordered differently for each additional parity request. The receiver then recursively performs the error correction.

Figure 3B:
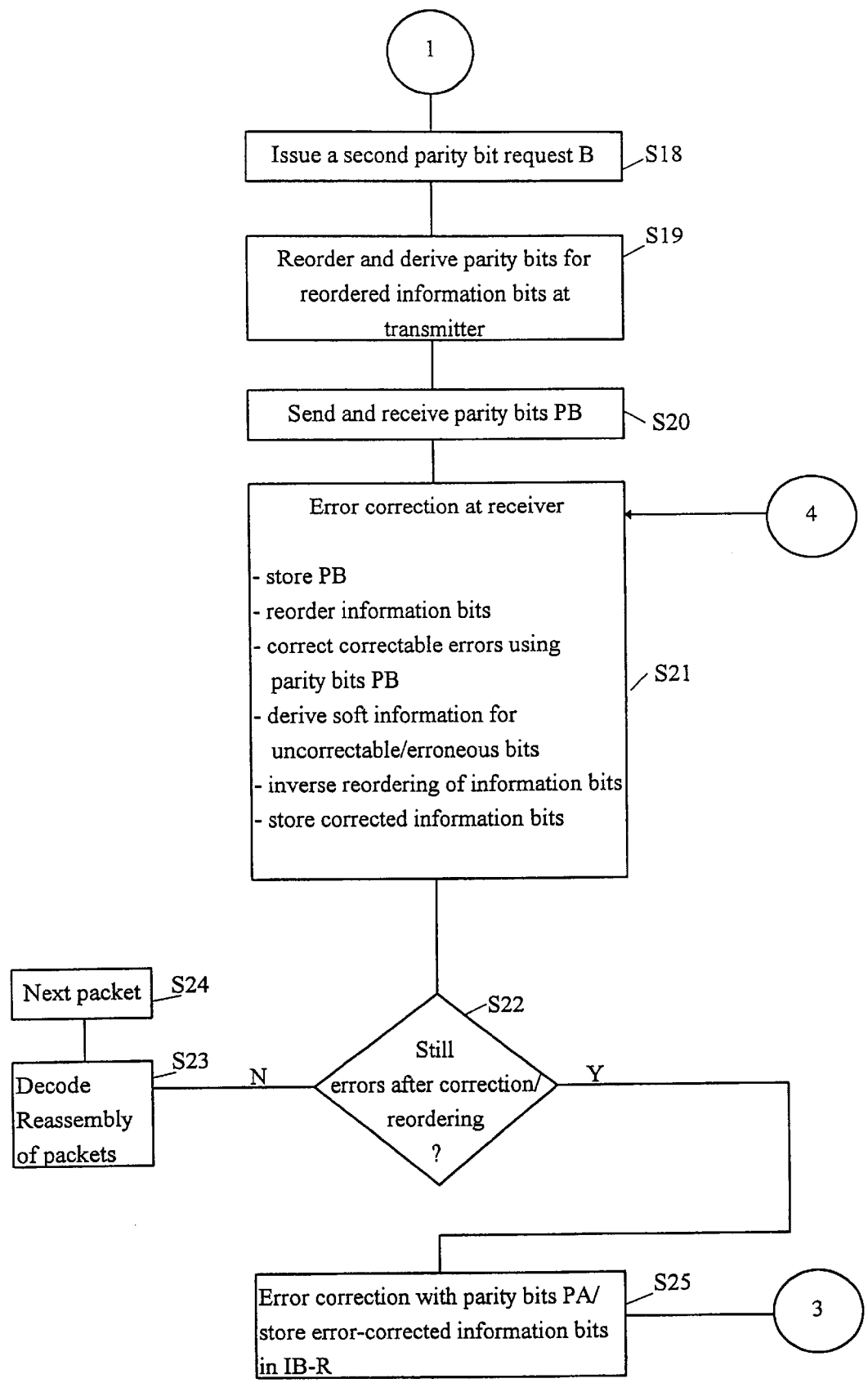
Figure 3C:
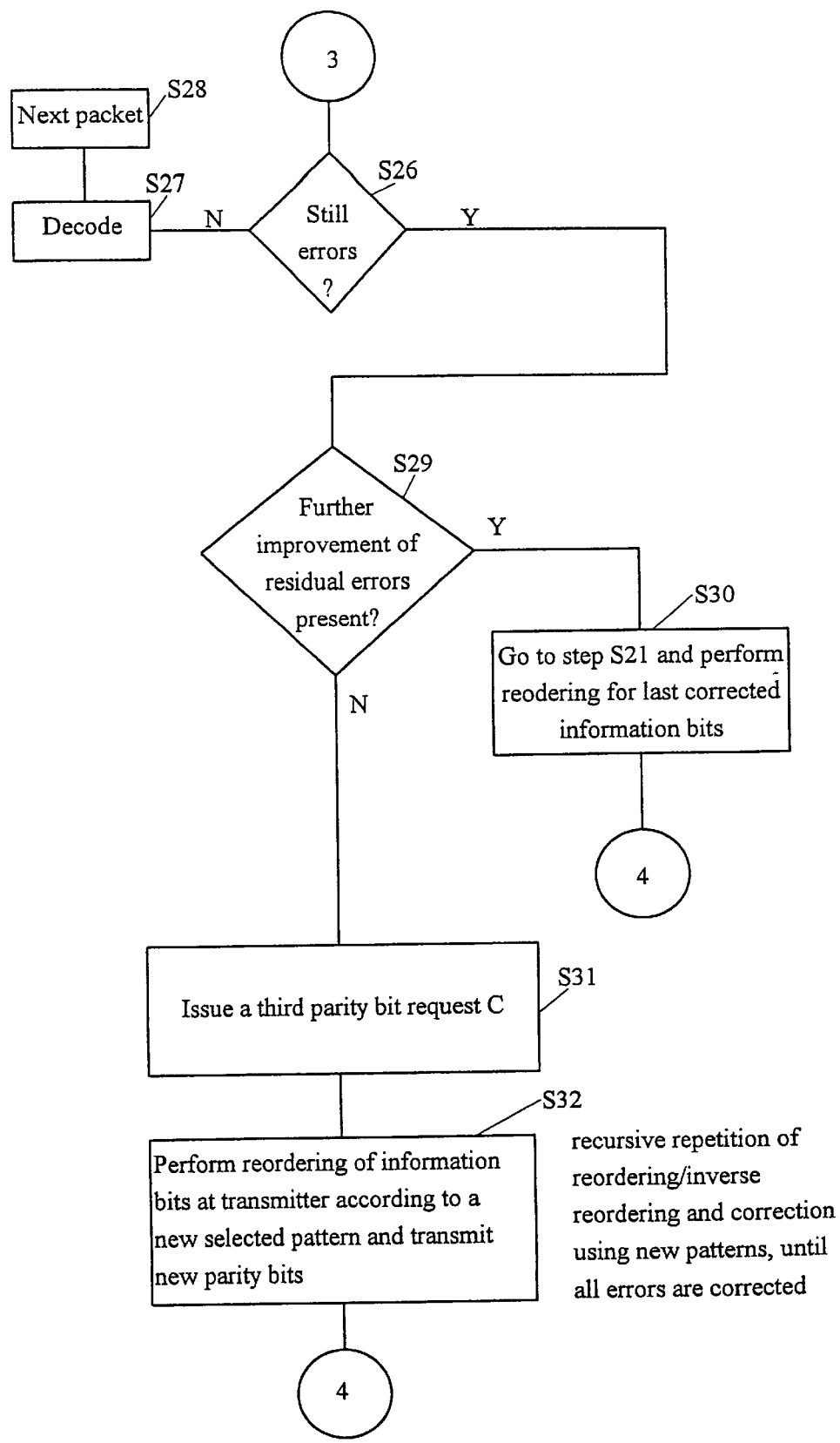

Hereinafter a detailed operation flow of the packet transmission system of FIG. 1 will be described with reference to the flow chart shown in FIGS. 3a, 3b, 3c. Here, detailed steps are shown for an error correction process using up to three parity bit requests. After the start in step S1, in step S2 the information source IS sends an information message, which is encoded into packets by the packet encoder in step S3. In the following, it is assumed that the packet was encoded using a systematic code, that is the packet consists of information bits and parity bits. Due to the encoding process in the packet encoder, a set of original information bits IB is generated and stored in the transmitter register means TRM, i.e. the register IB-T. Due to the encoding process, the information bits IB are arranged in a specific order, namely the original order they have resulting from the encoding process.

In step S4 the transmitter TM (i.e. the transmitter transmission means TR) sends to the receiver RC this set of original information bits IB, which are then received and stored in the information bit register IB-R in the receiver RC in step SS. The transmitter sends the original information bits IB without any (error) coding, or it can send the original information bits IB together with the parity bits PA which correspond to the original ordering, say REORD-A. REORD-A may involve no reordering process at all (just a one-to-one mapping) or is indeed a reordering intended to place more important bits at locations where they experience more protection by the parity bits PA.

That is, the first packet can be sent with or without parity bits. If it is sent with parity bits, then these first parity bits can also already be taken into account during the recursive iteration process. If the first parity bits, say parity bits PA, are sent at the first instance, the corresponding (re-)ordering can be the original ordering the packets possess due to the encoding process or indeed a reordering, e.g. REORD-A. This is e.g. the case, if information bits with different classes of importance are present. Bits with a higher class are more sensitive and can be protected more (e.g. in speech vocoders, parameters which model the vocal organs, should be protected more than excitation parameters). With a specific reordering (during the encoding process or indeed by using a specific reordering pattern even on the original information bits), more important bits can be placed in the data packet, such that they enjoy a greater protection by the parity bits PA. Thus, advantageously, even when the original information bits are sent, parity bits PA relating to a specific reordering can be transmitted along with the original information bits, wherein these original parity bits already enable an error correction in the receiver for information bits, which are very important.

In step S6, the error check means ECM performs an error detecting algorithm on the information bits IB stored in IB-R in order to identify, whether there are any errors in these original information bits IB. For this error checking algorithm in ECM a cyclic error check CRC can be used. If errors are detected in step S6, the error correction means ERM can, before the iterative correction procedure is started, also correct the received original information bits with the original parity bits PA, that have been transmitted along with the original information bits in the first sent data packet. The result is again stored in IB-R. Thereafter, the error check means again checks for errors in these information bits.

When no errors are detected in step S6, the packet is passed to the packet decoder for decoding and reassembly with other packets by the packet decoder in step S9. In step S10 the encoding of a next packet of information bits takes places at the packet encoder.

If during the initial stages, i.e. when the original packet has been sent for the first time, too many uncorrectable errors are experienced in step S7 by the error check means ECM, then the error check means ECM directly outputs a request ARQ for a complete retransmission of the original packet to the transmitter control means TCM in step S8 which issues a request for retransmission of the entire packet to the transmitter side transmission means TR, whereafter the packet with the original information bits is again transmitted in step S4.

If there is a manageable amount of errors detected in step S7, then the parity bit request means PBRM in step S11 issues a request for parity bits to the transmitter TM, namely to the transmitter control means TCM which controls the parity bit generation means PBGM. If no parity bits were sent during the first transmission, a request for parity bits PA corresponding to the original ordering REORD-A can be made. Otherwise, a request for a new reordering with corresponding parity bits can be made, say parity bits PB for reordering REORD-B. As aforementioned, on the basis of the soft information the parity bit request means PBRM can determine and include in the parity bit request a number REORD# of a reordering pattern to be used for reordering the information bits stored in the register IB-R. The specific number REORD# can be derived from the soft information derived from the error correction process with PA. However, if during the first transmission, no parity bits were transmitted, no soft information exists as yet and PBRM cannot issue a request for a specific reordering. In that case, the transmitter control means TCM instructs the transmitter reordering means RM-T to apply the reordering pattern REORD-A on top of the list stored in RPSM-T to the original information bits supplied from IB-T.

For the derivation of the parity bits in step S12 the original information bits IB are fed from the information bit register IB-R to the reordering means RM-T, where these information bits IB are reordered using the reordering pattern REORD-A from RPSM-T (see FIG. 2). Then, the parity bit generation means PBGM derives parity bits PA for the information bits which are once reordered using the first reordering pattern REORD-A (i.e. first order information bits). These parity bits PA are stored in PX-T, so that PA->PX-T. The contents of PX-T, namely PA, are then transmitted by the transmission means TR to the receiver RC in step S13.

Upon reception of PA by the transmission/reception means TR in the receiver RC, in step S14 the parity bits PA are first received in the receiver parity bit register PX-R and then stored in the receiver reordering pattern storage means RPSM-R at the corresponding place, namely next to REORD-A, since PA are associated with REORD-A (see RPSM-R in FIG. 2). The original information bits IB contained in IB-R are then fed to the reordering means RM-R and are reordered there using the first reordering pattern REORD-A from RPSM-R. The result of the reordering, i.e. the information bits IB once reordered using REORD-A, together with the parity bits PA from RPSM-R are fed to the error correction means ERM, where errors in the reordered information bits are corrected using PA, thus generating first order once error-corrected information bits. Whilst correcting the reordered information bits with PA the error correction means ERM also generates first soft information indicating the presence of uncorrectable, but erroneous information bits in the corrected information bits. The once reordered once error-corrected information bits of first order are then fed to the inverse reordering means INV-RM-R, where the once reordered once error-corrected information bits of first order are inversely reordered using the first inverse reordering pattern from INV-RPSM-R, namely the inverted reordering pattern $\overline{\text{REORD - A}}$ as is seen in FIG. 2. Due to the inverse reordering using $\overline{\text{REORD - A}}$, the first order information bits, which have been once error-corrected, are converted back to their original order and are then stored in IB-R by overwriting the originally transmitted information bits.

In step S15 the error check means ECM again make access to IB-R and checks the correctness of the once error-corrected information bits having the original order. If there are no more errors in step S15, then steps S16, S17, which are analogous to steps S9, S10, are executed to request the transmission of a new packet.

If there are further errors detected in step S15, then the parity bit request means PBRM issues a second request for parity bits to the transmitter TM in step S18. PBRM can use the first soft information for deciding which reordering pattern should be used next in the RM-T, i.e. whether REORD-B, REORD-C etc. should be used next. The second parity request made in step S18 can therefore now include a number REORD# of the next desired reordering pattern which is most appropriate for the information bits in IB-R. This will in general be a reordering pattern, in which the still erroneous bits are spaced as far from each other as possible, so that many "good" (i.e. with low error probability) bits surround the "bad" (i.e. with high error probability) bits. The parity bit request means PBRM can thus request the transmitter control means TCM to use this specific reordering pattern for the next reordering of information bits in the transmitter TM. If no specific reordering pattern (number) is preselected by the PBRM via REORD#, then simply the next in line in RPSM-T will be used, i.e. REORD-B.

In step S19 again the original information bits IB are fed from IB-T to RM-T and are reordered using the selected new second reordering pattern, say REORD-B. Thus information bits are provided, which have a new or second order. In step S19, again PBGM will generate new second parity bits PB for these second order information bits. The parity bits PB are then in turn stored in PX-T, i.e. PB->PX-T, and transmitted to the receiver RC in step S20, where there are received in PX-R and supplied to RPSM-R to be stored next to the associated reordering pattern REORD-B. It should be noted, that in response to the parity bit request, not the entire data packet, but only the newly derived second parity bits PB are transmitted.

Now, in step S21, in response to the reception of the parity bits PB, the once error-corrected information bits in IB-R are again fed to the reordering means RM-R. RM-R performs a reordering of these once error-corrected information bits (having the original order) by using the very same reordering pattern REORD-B as was used in the transmitter for the deriving of the new second parity bits PB. That is, in step S21, information bits are obtained, which have been error-corrected once with parity bits PA and subsequently reordered by using the reordering pattern REORD-B, that is, once error-corrected second-order information bits are obtained in the RM-R.

In step S21, the second parity bits PB from RPSM-R and the second order once error-corrected information bits from RM-R are then fed to the error correction means ERM, where a second error correction is carried out using the second parity bits PB and second soft information is again generated. The result in ERM are second order twice error-corrected information bits. INV-RM-R in step S21 uses an inverse of the second reordering pattern $\overline{\text{REORD - B}}$ from INV-RPSM-R to convert the second order twice error-corrected information bits back to the original order. These twice error-corrected information bits having the original order are then again stored in IB-R, where they overwrite the last stored once error-corrected information bits having the original order. Thus, it is ensured that IB-R always stores information bits having the original ordering.

If no more errors are present, then steps S23, S24 just like steps S16, S17 are carried out.

If in step S25 the ECM still detects errors in the information bits stored in IB-R, i.e. if the information bits after correction with PB are still incorrect, then in step S25 the information bits, which are now stored in IB-R, are again reordered using REORD-A in RM-R and a further third error correction of the first order twice error-corrected information bits is carried out again using PA in ERM. These first order three times error-corrected information bits are again converted back to the original order using $\overline{\text{REORD - A}}$ in INV-RM-R. This process is continued alternately using REORD-B, PB & $\overline{\text{REORD - B}}$ and REORD-A, PA & $\overline{\text{REORD - A}}$ through steps S26, S29, S30 and steps S21, S22, S25, until no further improvement of errors in detected in step S29. During this alternate iteration IB-R will always store information bits having the original order and having been n-times error-corrected, wherein n denotes the number of iteration steps when jumping forth and back between REORD-A and REORD-B. In each error correction in ERM new soft information is also derived.

When the error correction possibilities using PA, PB have been fully exhausted, i.e. when no further improvement of errors is detected in step S29 ('N' in step S29), the receiver can decide that no more error correction should be performed for the current data packet and thus request a new data packet (i.e. new information bits) from the transmitter. For this decision an error criterium may be used, which indicates the amount of errors admissible in a data packet before it passed to the packet decoder for assembly in the information message to be transmitted to the information receiver IR.

When in step S29 the receiver decides on a further error correction of the current information bits which are now stored in the IB-R, then the parity bit request means PBRM makes a new third request for parity bits in step S31. PBRM can use the soft information obtained in the preceding iteration step for indicating a particular choice of reordering patterns to be used in the transmitter TM by including REORD# in the new third parity bit request. RM-T will now use a new third reordering pattern from RPSM-T, say REORD-C (see FIG. 2), and PBGM will generate third parity bits PC, which are in an analogous manner as before transmitted to the receiver and stored next to REORD-C in RPSM-R. Thus steps from step S21 to step S29 are now carried out using alternately REORD-A, PA and REORD-C, PC until no further error improvement is detected by ECM.

Rather than continuing the alternate iteration between REORD-A, PA and REORD-C, PC the alternate iteration may also be continued by jumping back and forth between REORD-B, PB and REORD-C, PC. Even a recursive iteration through REORD-A, PA->REORD-C PC ->REORD-B, PB or REORD-B, PB ->REORD-C, PC ->REORD-A, PA is possible. If again no further error improvement is obtained the scheme can be likewise extended to include a further reordering pattern and further parity bits by making a further parity bit request.

As far as the recursive scheme is concerned, this may be seen similar to the conventional turbo-coding, however, in the present invention it was recognized, that the additional parity information derived by turbo-coding is no more than changing the ordering of the information bits.

In the above-described error correction method, the apparatus and the packet transmission system, an improved throughput of packets per unit time can be achieved, since parity bits must additionally only be transmitted, when the recursive correction in the receiver achieves no further improvement of errors. Furthermore, the receiver by using the sequential adding of parity bits, can also use all the previously accumulated information and corrected information bits for a further correction, so that accuracy of error correction is much improved. Thus, the technique is superior to the mere combination of a FEC/ARQ-system, despite it uses features of both methods.

Since also the parity bits themselves may suffer an error during transmission to the receiver, in another embodiment of the invention, it is also possible to correct errors in the parity bits themselves during the error correction in ERM. This can be advantageous in the iteration process where formerly correct information bits can be "corrected" wrong in later stages of the recursive scheme. In this case the final corrected parity bits PX are overwriting the original parity bits in RPSM-R.

That is, the parity bits themselves can be corrected at the same time as correcting the information bits. For example, if the error correction means ERM uses a forward error correction method FEC, the information bits, say k bits, plus the parity bits, say m bits, form a code word of n=k+m bits. The error correction capability results from the fact that there are only a restricted number of codewords, usually called the alphabet, whose size is usually much smaller than $2^n$. If due to error, the information bit/parity bit-codeword is mutilated, a word may result, which is not present in the alphabet. If the mutilated word is compared with the valid codewords of the alphabet, there is usually (when the number of bit errors is not too large) a valid codeword, that is very close to the received mutilated codeword. It is then assumed that this closest codeword was the codeword transmitted and the erroneous bits in the received codeword are corrected correspondingly. This is called the maximum likelihood or ML-scheme. It is seen that the ML-scheme does not distinguish between information bits and parity bits, since it only handles a codeword. If the mutilated codeword is corrected, the corrected bits can well be parity bits or information bits. Thus, after the correction process in ERM, the (corrected) information bits overwrite the last stored information bits in IB-R and the (corrected) parity bits overwrite the proper location in RPSM-R. By selecting the very codeword from the alphabet, which possesses the closest "distance" to the mutilated codeword in the vector space, not only the information bits, but also the parity bits are thus corrected.

Since the packet length can be of a fixed length, a transmission of parity bits can contain a number of parity bit sets PX for a number of different reordering sequences. For example, when performing a request for parity bits, the parity bit request means PBRM can request not only a generation and transmission of one set of parity bits PA for REORD-A, but PBRM can request the transmission of parity bits for M different reordering patterns REORD-A, REORD-B, REORD-C etc. simultaneously in the parity bit request message REORD# transmitted to the transmitter control means TCM. The number M may apply to the first M reordering patterns in RPSM-T or alternatively PBRM may select specific ones out of the list in RPSM-T. The transmitter TM will then transmit these M sets of parity bits all in one packet. Again it may be understood, that also this parity bit packet consisting of M sets of parity bits can be "regarded" as "information bits" packet and likewise undergo an iterative correction just as in the case of a single parity bit packet for only a single set of parity bits PA, PB, PC.

Furthermore, it may be noted, that the receiver can also display its correction results on a display screen CRT for example to enable a user to select or input a particular new reordering pattern to be used in the next reordering step and correction step.

The recursive iteration carried out in the receiver apparatus according to the invention can be summarized as follows. The following notation will be used: $[IB]_{PX}$ indicates an error correction of information bits IB by parity bits PX; and IB*REORD-# indicates a reordering of information bits IB using a reordering pattern REORD-#. "*" indicates an "application" of a reordering pattern on information bits. It may however be understood that this "application" is not restricted to a multiplication of information bits with a reordering pattern or reordering matrix REORD-#. Any reordering scheme may be used for the information bits, provided that the same reordering scheme is used in the transmitter and receiver. The generation of parity bits by the parity bit generation means PBGM in response to a parity request from the receiver is known state of the art and will therefore be not further described here. Any known parity bit generation scheme can be applied and the invention is not restricted to any particular scheme.

First step (original reception)

A reception of original information bits IB of a single packet and an error check is carried out. When too many errors are detected then parity bits PA are requested. In IB-R the following is available:

IB

Since no reordering has as yet been applied IB will possess the original order which they possess as a result of the encoding process in the transmitter.

Second step (first error correction)

Reception of PA and correction of IB with PA after reordering with REORD-A results in ERM:

$[IB*REORD-A]_{PA}$

These information bits are once error-corrected (with PA) information bits of a (new) first (A) order. These information bits are converted back to the original ordering by using an inverse of REORD-A in INV-RM-R, i.e. $\overline{REORD-A}$. IB-R now stores in original order:

$[IB*REORD\text{-}A]_{PA}*\overline{REORD\text{-}A}$

These information bits are once error-corrected (with PA) information bits of original (encoding) order.

Third step (second error correction)

PB is received and REORD-B, PB is applied to the contents in IB-R. Error correction is now done for the again reordered information bits, which have already been error-corrected once. ERM obtains:

$[[IB*REORD\text{-}A]_{PA}*\overline{REORD\text{-}A}*REORD\text{-}B]_{PB}$

These information bits are twice error-corrected (with PA, PB) information bits of a (new) second (B) order. Since this result is in the B-order, is thus reconverted into the original ordering in INV-RM-R, which yields in IB-R:

$[[IB*REORD\text{-}A]_{PA}*\overline{REORD\text{-}A} \quad *REORD\text{-}B]_{PB}*\overline{REORD\text{-}B}$ These information bits are twice error-corrected (with PA, PB) information bits of the original (encoding) order.

Fourth step (third error correction)

An error correction is again carried out using REORD-A, PA. The result, which is stored in IB-R is (again in original ordering): $[[[IB*REORD\text{-}A]_{PA}*\overline{REORD\text{-}A} \ *REORD\text{-}B]_{PB}* \overline{REORD\text{-}B} * REORD\text{-}A]_{PA}*\overline{REORD\text{-}A}$ These information bits are three times error-corrected (with PA, PB, PA) information bits of the original order. The process is continued between REORD-A, PA and REORD-B, PB until new parity bits PC are requested when no further error improvement is detected.

As mentioned above, at the same time, an intermediate correction of parity bits, i.e. $[PX]_{PX}$ would indicate an error correction of parity bits PX by respective parity bits PX.

INDUSTRIAL APPLICABILITY

The error correction method, apparatus for error correction and packet transmission system including an error correction as described above can be applied to any kind of communication system, in which an original information message is segmented into individual data packets carrying information bits. For the error checking and error corrections in the error check means ECM and the error correction means ERM conventionally used error detection and error correction algorithms can be used and the invention is not specifically restricted to any scheme.

Reference numerals in the claims only serve clarification purposes and do not limit the scope of these claims.

We claim:

1. A method for correcting information bits (IB) of a data packet (P), which have been subjected to errors due to a transmission of said data packet (P) between a transmitter (TM) and a receiver (RC), wherein
    a) the original information bits (IB) of said data packet (P) before transmission are reordered at said transmitter (TM) using a selected reordering pattern (REORD-A, REORD-B, REORD-C) in response to a parity bit request issued by said receiver (RC);
    b) a set of parity bits (PA, PB, PC) for said reordered original information bits are derived and transmitted by said transmitter (TM) to said receiver (RC);
    c) said erroneous information bits received at said receiver (RC) are reordered using said selected reordering pattern (REORD-A, REORD-B, REORD-C); and
    d) said reordered erroneous information bits (IB) are corrected at said receiver (RC) using said set of parity bits (PA, PB, PC) received from said transmitter (TM).

2. A method according to claim 1, wherein
after said error-correction, said corrected reordered information bits are inversely reordered using an inverse of said selected reordering pattern ($\overline{REORD\text{-}A}$, $\overline{REORD\text{-}B}$, $\overline{REORD\text{-}C}$).

3. A method according to claim 1, wherein
a plurality of sets of parity bits (PA, PB, PC) are derived and transmitted by said transmitter (TM), wherein each set of parity bits (PA, PB, PC) is derived for said original information bits which have been respectively reordered using a plurality of different reordering patterns (REORD-A, REORD-B, REORD-C).

4. Method according to claim 1, wherein
in said error correction step carried out at said receiver not only said information bits are corrected, but simultaneously also said parity bits.

5. A method for correcting information bits (IB) of a data packet (P), which have been subjected to errors due to a transmission of said data packet (P) between a transmitter (TM) and a receiver (RC), wherein the original information bits (IB) of said data packet (P) before transmission are reordered at said transmitter (TM) using a selected reordering pattern (REORD-A, REORD-B, REORD-C) in response to a parity bit request issued by said receiver (RC), a set of parity bits (PA, PB, PC) for said reordered original information bits are derived and transmitted by said transmitter (TM) to said receiver (RC), said erroneous information bits received at said receiver (RC) are reordered using said selected reordering pattern (REORD-A, REORD-B, REORD-C) and said reordered erroneous information bits (IB) are corrected at said receiver (RC) using said set of parity bits (PA, PB, PC) received from said transmitter (TM), said method comprising the following specific steps:
    a) reordering (S14) at said receiver said information bits according to a first selected reordering pattern (REORD-A);
    b) performing (S14) at said receiver a first error correction of said reordered information bits with first parity bits (PA) generated at and transmitted from said transmitter for said original information bits reordered according to said first selected reordering pattern (REORD-A);
    c) inverse reordering (S14) of said error corrected information bits at said receiver using an inverse of said first selected reordering pattern ($\overline{REORD\text{-}A}$); and
    d) reordering (S21) at said receiver said error-corrected information bits according to a second selected reordering pattern (REORD-B);
    e) performing (S21) at said receiver a second error correction of said reordered information bits with second parity bits (PB) generated at and transmitted from said transmitter for said original information bits reordered according to said second selected reordering pattern (REORD-B);
    f) inverse reordering (S21) of said error corrected information bits at said receiver using an inverse of said second selected reordering pattern ($\overline{REORD\text{-}B}$); and
    g) when an error checking (S22) detects further errors in said error corrected information bits after step f), recursively repeating (S25, S26, S29, S30; S21, S22) at said receiver said steps a)–c) and said steps d)–f) until no further improvements of errors is detected (S29).

6. Method according to claim 5, wherein
said first and second reordering patterns (REORD-A, REORD-B) are sequentially selected from a plurality of reordering patterns respectively stored in a reordering pattern storage means (RPSM-T, RPSM-R) in the receiver and the transmitter.

7. Method according to claim 5, wherein
said error correction in steps b), e) generates soft information.

8. Method according to claim 5, wherein
when too many uncorrectable errors are detected (S7) at said receiver after receiving said original packet, a request for retransmission (ARQ) of the complete original packet is transmitted (S8) from said receiver to said transmitter before step a).

9. Method according to claim 5, wherein when too little improvement or even degradation is experienced after the recursive scheme a request for retransmission (ARQ) of the complete packet is transmitted (S8) from said receiver to said transmitter.

10. Method according to claim 5, wherein
said correction of errors in said information bits is performed using a forward error correction (FEC) and said checking of information bits for errors is performed using an error checking algorithm, such as cyclic error check (CRC).

11. Method according to claim 5, wherein
information is encoded into said packets using a systematic code, such that said data packet consists of said information bits and parity bits.

12. Method according to claim 5, wherein
in said step b), e) or i) not only said information bits are corrected, but simultaneously said first, second or third parity bits.

13. A method according to claim 5, wherein
said second parity bits (PB) used for said second error correction in said step e) are provided through the following steps performed before step d):
  d1) transmitting (S18) a second parity bit request from said receiver to said transmitter, when an error checking detects (S15) uncorrectable errors in said error-corrected information bits; and
  d2) reordering (S19) said original information bits at said transmitter according to said selected second reordering pattern (REORD-B) and deriving (S19) and transmitting (S20) to said receiver said second parity bits (PB) for said reordered information bits.

14. Method according to claim 13, wherein when too little improvement or even degradation is experienced after the recursive scheme a request for retransmission (ARQ) of the complete packet is transmitted (S8) from said receiver to said transmitter.

15. Method according to claim 13, wherein
at said transmitter at least two sets of parity bits (PA, PB, PC) are generated by respectively reordering said information bits using at least two different reordering patterns (REORD-A, REORD-B, REORD-C) in response to one of said parity bit requests, wherein said at least two sets of parity bits (PA, PB, PC) are transmitted to said receiver commonly as one common parity bit data packet.

16. A method according to claim 5, wherein
said first parity bits (PA) used for said first error correction in said step b) are provided through the following steps performed before step a):
  a1) transmitting (S11) a first parity bit request from said receiver to said transmitter, when an error checking detects (S6, S7) uncorrectable errors in said transmitted information bits; and
  a2) reordering (S12) said information bits at said transmitter according to said selected first reordering pattern (REORD-A) and deriving and transmitting (S13) to said receiver said first parity bits (PA) for said reordered information bits.

17. Method according to claim 16, wherein
at said transmitter at least two sets of parity bits (PA, PB, PC) are generated by respectively reordering said information bits using at least two different reordering patterns (REORD-A, REORD-B, REORD-C) in response to one of said parity bit requests, wherein said at least two sets of parity bits (PA, PB, PC) are transmitted to said receiver commonly as one common parity bit data packet.

18. Method according to claim 16 wherein
said parity bit requests in step a1), d1), g1) include an indication (REORD#) as to which reordering pattern (REORD-A, REORD-B, REORD-C) is to be selected for said reorderings, wherein said indication is derived on the basis of a last derived soft information.

19. Method according to claim 13 wherein
said parity bit requests in step a1), d1), g1) include an indication (REORD#) as to which reordering pattern (REORD-A, REORD-B, REORD-C) is to be selected for said reorderings, wherein said indication is derived on the basis of a last derived soft information.

20. Method according to claim 19, wherein when too little improvement or even degradation is experienced after the recursive scheme a request for retransmission (ARQ) of the complete packet is transmitted (S8) from said receiver to said transmitter.

21. Method according to claim 5, comprising the following steps after step g):
  h) reordering (S21) at said receiver said error-corrected information bits according to a third selected reordering pattern (REORD-C);
  i) performing (S21) at said receiver a third error correction of said reordered information bits with third parity bits (PC) generated at and transmitted from said transmitter for said original information bits reordered according to said third selected reordering pattern (REORD-C); and
  j) inverse reordering (S21) of said error corrected information bits at said receiver using an inverse of said second selected reordering pattern ($\overline{\text{REORD - C}}$).

22. Method according to claim 21, wherein
when an error checking detects further errors in said error corrected information bits after step j), recursively repeating at said receiver steps d)–f) and steps h)–j) until no further improvements of errors is detected.

23. Method according to claim 21, wherein
when an error checking detects further errors in said error corrected information bits after step j), recursively repeating at said receiver steps a)–c), steps d)–f) and steps h)–j) in arbitrary sequence until no further improvements of errors is detected.

24. Method according to claim 21, wherein
in said step b), e) or i) not only said information bits are corrected, but simultaneously said first, second or third parity bits.

25. Method according to claim 21, wherein
when an error checking detects further errors in said error corrected information bits after step j), recursively repeating at said receiver steps a)–c) and steps h)–j) until no further improvements of errors is detected.

26. Method according to claim 25, wherein when too little improvement or even degradation is experienced after the recursive scheme a request for retransmission (ARQ) of the complete packet is transmitted (S8) from said receiver to said transmitter.

27. Method according to claim 21, wherein
said third parity bits (PC) used for error correction in said step i) are provided through the following steps performed before step h):
g1) transmitting (S31) a third parity bit request from said receiver to said transmitter;
g2) reordering said information bits at said transmitter according to said selected third reordering pattern (REORD-C) and deriving and transmitting to said receiver said third parity bits (PC) for said reordered information bits.

28. Method according to claim 27, wherein when too little improvement or even degradation is experienced after the recursive scheme a request for retransmission (ARQ) of the compete packet is transmitted (S8) from said receiver to said transmitter.

29. Method according to claim 27, wherein
at said transmitter at least two sets of parity bits (PA, PB, PC) are generated by respectively reordering said information bits using at least two different reordering patterns (REORD-A, REORD-B, REORD-C) in response to one of said parity bit requests, wherein said at least two sets of parity bits (PA, PB, PC) are transmitted to said receiver commonly as one common parity bit data packet.

30. Method according to claim 27 wherein
said parity bit requests in step a1), d1), g1) include an indication (REORD#) as to which reordering pattern (REORD-A, REORD-B, REORD-C) is to be selected for said reorderings, wherein said indication is derived on the basis of a last derived soft information.

31. Method according to claim 30, wherein when too little improvement or even degrading is experienced after the recursive scheme a request for retransmission (ARQ) of the complete packet is transmitted (S8) from said receiver to said transmitter.

32. Packet transmission system for data packet transmission and for error-correction of data packets (P) having erroneous information bits due to errors caused on a transmission link (TL) between a data packet transmitter (TM) and a data packet receiver (RC), said transmitter (TM) comprising:
a1) a transmitter reordering means (RM-T) for reordering the original information bits (IB) of said data packet (P) before transmission using a selected reordering pattern (REORD-A, REORD-B, REORD-C) in response to a parity bit request transmitted by said receiver (RC); and
a2) a parity bit generation means (PBGM) for generating a set of parity bits (PA, PB, PC) for said original information bits reordered by said transmitter reordering means (RM-T); and said receiver (RC) comprising:
b1) a parity bit request means (PBRM) for transmitting a parity bit request to said transmitter; and
b2) a receiver reordering means (RM-T) for reordering said received erroneous information bits of said transmitted data packet (P) using said selected reordering pattern (REORD-A, REORD-B, REORD-C); and
b3) an error correction means (ERM) for error correction said reordered erroneous information bits (IB) using said set of parity bits (PA, PB, PC) received from said transmitter (TM).

33. System according to claim 32, wherein
said error correction means (ERM) not only corrects said erroneous information bits, but simultaneously also said parity bits.

34. Packet transmission system for data packet transmission and for error-correction of data packets (P) having erroneous information bits due to errors caused on a transmission link (TL) between a data packet transmitter (TM) and a data packet receiver (RC), said transmitter (TM) comprising:
a1) a transmitter reordering means (RM-T) for reordering the original information bits (IB) of said data packet (P) before transmission using a selected reordering pattern (REORD-A, REORD-B, REORD-C) in response to a parity bit request transmitted by said receiver (RC); and
a2) a parity bit generation means (PBGM) for generating a set of parity bits (PA, PB, PC) for said original information bits reordered by said transmitter reordering means (RM-T);
a3) a transmitter reordering pattern storage means (RPSM-T) for storing a plurality of reordering patterns (REORD-A, REORD-B, REORD-C);
a4) wherein said transmitter reordering means (RM-T) is adapted for reordering said original information bits (IB) stored in a transmitter information bit register (IB-T) according to one of said reordering patterns;
a5) a transmission means (TR) for transmitting said original information bits (IB) and said parity bits to said receiver (RC); and
a6) a transmitter control means (TCM) for controlling said transmitter reordering means (RM-T) to reorder said original information according to a selected reordering pattern and said parity bit generation means (PBGM) for generating parity bits (PA, PB, PC) for these reordered information bits in response to receiving a parity bit request from said parity bit request means (PBRM); and said receiver (RC) comprising:
b1) a parity bit request means (PBRM) for transmitting a parity bit request to said transmitter; and
b2) a receiver reordering means (RM-T) for reordering said received erroneous information bits of said transmitted data packet (P) using said selected reordering pattern (REORD-A, REORD-B, REORD-C); and
b3) an error correction means (ERM) for error correction said reordered erroneous information bits (IB) using said set of parity bits (PA, PB, PC) received from said transmitter (TM);
b4) a receiver reordering pattern storage means (RPSM-R) for storing said plurality of reordering patterns (REORD-A, REORD-B, REORD-C);
b5) a reception means (TR) for receiving said original information bits (IB) and parity bits (PA, PB, PC) and storing them in a receiver information bit register (IB-R) and in said reordering pattern storage means (RPSM-R), respectively;
b6) wherein said receiver reordering means (RM-T) is adapted for reordering information bits (IB) stored in said receiver information bit register (IB-R) according to one of said reordering pattern;
b7) an inverse reordering means (INV-RM-R) for inversely reordering said error corrected information bits from said error correction means (ERM) using an inverse of said reordering pattern and for storing said inversely reordered information bits in said receiver information bit register (IB-R);
b8) an error check means (ECM) for checking said information bits contained in said receiver information bit register (IB-R) for errors;
b9) wherein said parity bit request means (PBRM) is adapted for transmitting said parity bit request to said transmitter when uncorrectable errors are detected by said error check means (ECM).

35. System according to claim 34, wherein
an inverse reordering pattern storage means (INV-RPSM-R) is provided for storing an inverse of said reordering patterns stored in said receiver reordering pattern storage means (RPSM-R).

36. System according to claim 34, wherein
an inversion means is provided for inverting said reordering patterns (REORD-A, REORD-B, REORD-C) stored in said receiver reordering pattern storage means (RPSM-R).

37. System according to claim 34, wherein
said error check means (ERM) performs said checking of information bits (IB) for errors using an error checking algorithm, such as cyclic error check CRC.

38. System according to claim 34, wherein
said error correction means (ERM) corrects correctable errors of said errors in said reordered information bits using said associated parity bits (PA, PB, PC) and generates soft information.

39. System according to claim 34, wherein
said parity bit request means (PBRM) uses soft information generated in a previous error correction for including in said parity bit request an indication (REORD#) as to which reordering pattern is to be selected for a reordering and generation of parity bits in said transmitter.

40. System according to claim 34, wherein
said receiver reordering pattern storage means (RPSM-R sequentially stores a number of reordering patterns (REORD-A; REORD-B, REORD-C) and whenever a new parity bit request is received in said receiver, said reordering means uses a next in line reordering pattern for the generation of parity bits.

41. System according to claim 34, wherein
said receiver sends a request for retransmission (ARQ) of the data packet to said transmitter, when too many errors are detected by said error check means (ECM) after the first transmission of said data packet.

42. System according to claim 34, wherein said receiver sends a request for retransmission (ARQ) of the complete data packet to said transmitter, when too little improvement or even degradation is detected by said error check means (ECM) after a recursive scheme or after repeated parity bit requests by a parity bit request means (PBRM).

43. System according to claim 34, wherein
in response to receiving a parity bit request from said receiver, said parity bit generation means (PBGM) generates several sets of parity bits (PA, PB, PC) for said original information bits having been respectively reordered according to said reordering patterns by said transmitter reordering means (RM-T), wherein said transmission means (TR) transmits a single data packet which commonly contains all generated sets of parity bits (PA, PB, PC) to said receiver.

44. System according to claim 34, wherein said receiver further comprises:
b10) a receiver control means (RCM) for controlling said receiver reordering means (RM-R), said error correction means (ERM) and said inverse reordering means (INV-RM-R) for recursively performing
a first error correction of information bits stored in said receiver information bit register (IB-R) and reordered with a first reordering pattern (REORD-A) with associated first parity bits (PA), and
a second error correction of information bits stored in said receiver information bit register (IB-R) and reordered with a second reordering pattern (REORD-B) with associated second parity bits (PB);
until no further error correction improvement is detected by said error check means (ECM).

45. System according to claim 44, wherein said receiver sends a request for retransmission (ARQ) of the complete data packet to said transmitter, when too little improvement or even degradation is detected by said error check means (ECM) after a recursive scheme or after repeated parity bit requests by a parity bit request means (PBRM).

46. An apparatus for correcting errors in data packets (P) having erroneous information bits due to errors caused on a transmission link (TL) between a data packet transmitter (TM) and a data packet receiver (RC), comprising:
a) a parity bit request means (PBRM) for transmitting a parity bit request to said transmitter; and
b) a reordering means (RM-R) for reordering said received erroneous information bits of said transmitted data packet (P) using a selected reordering pattern (REORD-A, REORD-B, REORD-C);
c) an error correction means (ERM) for error correction of said erroneous information bits (IB) reordered by said reordering means (RM-R) using a set of parity bits (PA, PB, PC) being generated at and transmitted from said transmitter for said original information bits reordered according to said selected reordering pattern (REORD-A, REORD-B, REORD-C) in response to a parity bit request issued by said parity bit request means (PBRM).

47. Apparatus according to claim 46, including
d) an inverse reordering means (INV-RM-R) for inversely reordering said reordered information bits which have been corrected by said error correction means using an inverse of said selected reordering pattern ( $\overline{\text{REORD - A}}, \overline{\text{REORD - B}}, \overline{\text{REORD - B}}$ ).

48. Apparatus according to claim 46, characterized in that
said error correction means (ERM) not only corrects said erroneous information bits, but simultaneously also said parity bits.

49. Apparatus according to claim 46, wherein said transmitter comprises:
e) a transmitter control means (TCM) for controlling a transmitter reordering means (RM-T) to reorder said original information according to said selected reordering pattern and a parity bit generation means (PBGM) for generating parity bits (PA, PB, PC) for these reordered information bits in response to receiving said parity bit request from said parity bit request means (PBRM).

50. Apparatus for correcting errors in data packets (P) having erroneous information bits due to errors caused on a transmission link (TL) between a data packet transmitter (TM) and a data packet receiver (RC), comprising:
a) a parity bit request means (PBRM) for transmitting a parity bit request to said transmitter; and
b) a reordering means (RM-R) for reordering said received erroneous information bits of said transmitted data packet (P) using a selected reordering pattern (REORD-A, REORD-B, REORD-C);
c) an error correction means (ERM) for error correction of said erroneous information bits (IB) reordered by said reordering means (RM-R) using a set of parity bits (PA, PB, PC) being generated at and transmitted from said transmitter for said original information bits reordered according to said selected reordering pattern (REORD-A, REORD-B, REORD-C) in response to a parity bit request issued by said parity bit request means (PBRM);

d) an inverse reordering means (INV-RM-R) for inversely reordering said reordered information bits which have been corrected by said error correction means using an inverse of said selected reordering pattern (REORD - A, REORD - B, REORD - B);

e) a reordering pattern storage means (RPSM-R) for storing a plurality of reordering patterns (REORD-A, REORD-B, REORD-C);

f) a reception means (TR) for storing said original information bits (IB) in a receiver information bit register (IB-R) and parity bits (PA, PB, PC) in said reordering pattern storage means (RPSM-R);

g) wherein said reordering means (RM-T) is adapted for reordering said information bits (IB) stored in said information bit register (IB-R) according to said selected reordering pattern;

h) wherein said inverse reordering means (INV-RM-R) is further adapted for storing said inversely reordered information bits in said receiver information bit register (IB-R);

i) an error check means (ECM) for checking said information bits contained in said receiver information bit register (IB-R) for errors;

j) wherein said parity bit request means (PBRM) is adapted for transmitting said parity bit request to said transmitter when uncorrectable errors are detected by said error check means (ECM).

51. Apparatus according to claim 50, further comprising:

k) a control means (RCM) for controlling said reordering means (RM-R), said error correction means (ERM) and said inverse reordering means (INV-RM-R) for recursively performing a first error correction of information bits stored in said information bit register (IB-R) and reordered with a first reordering pattern (REORD-A) with associated first parity bits (PA), and a second error correction of information bits stored in said information bit register (IB-R) and reordered with a second reordering pattern (REORD-B) with associated second parity bits (PB);

until no further error correction improvement is detected by said error check means (ECM).

52. A method of correcting information bits (IB) of a data packet (P), which have been subjected to errors due to a transmission of said data packet (P) between a transmitter (TM) and a receiver (RC), wherein said information bits are corrected in said receiver using parity bits transmitted by said transmitter;

said receiver issues a parity bit request to said transmitter when further correction of said information bits is not possible using said parity bits present in said receiver at any time; and said transmitter selects a new reordering pattern for reordering said original information bits stored (IB-T) in said transmitter respectively in response to a respective parity bit request, reorders said stored information bits using said selected reordering pattern, derives new parity bits for said reordered information bits and transmits them to said receiver for further error correction.

53. A packet transmission system for data packet transmission and for error correction of said data packets (P) having erroneous information bits due to errors caused on a transmission link (TL) between a data packet transmitter (TM) and a data packet receiver (RC); said transmitter (TM) comprising:

a4) a transmitter information bit register (IB-T) for storing the information bits of said data packet;

a3) transmitter reordering pattern storage means (RPSM-T) for storing a plurality of reordering patterns (REORD-A, REORD-B, REORD-C);

a1) transmitter reordering means (RM-T) for reordering said stored information bits (IB) of said data packet (P) by using a selected reordering pattern of said transmitter reordering pattern storage means, a4) said transmitter reordering means (RM-T) being adapted to select from said transmitter reordering pattern storage means a new reordering pattern (REORD-A, REORD-B, REORD-C) for reordering said stored information bits each time a parity bit request is transmitted by said receiver; and a2) parity bit generating means (PBGM) for generating parity bits (PA, PB, PC) for said reordered information bits and for transmitting these parity bits to said receiver in response to said parity bit request; and said receiver (RC) comprising:

b5) a receiver information bit register (IB-R) for storing said information bits in said receiver;

b3) error correction means (ERM) for error correction of said information bits (IB) in said receiver by using said parity bits (PA, PB, PC) respectively transmitted by said transmitter;

b8) error check means (ECM) for checking said information bits for errors; and b1) parity bit request means (PBRM) for transmitting parity bit requests to said transmitter whenever errors which cannot be further corrected by using said parity bits present in said receiver at any time are still found by said error check means in said corrected information bits after error correction by said error correction means.

54. A method of correcting information bits (IB) of a data packet (P), which have been subjected to errors due to a transmission of said data packet (P) between a transmitter (TM) and a receiver (RC), comprising the steps of:

a') transmitting said information bits (IB) from said transmitter (TM) to said receiver (RC) and storing said information bits (IB) in said transmitter (TM) and said transmitted information bits in said receiver;

a") transmitting a parity bit request from said receiver (RC) to said transmitter (TM) when errors are found in said information bits present in said receiver at any time;

a) selecting a reordering pattern (REORD-A, REORD-B, REORD-C) in said transmitter and reordering said information bits (IB) stored in said transmitter by using said selected reordering pattern in response to said parity bit request;

b) deriving parity bits (PA, PB, PC) for said reordered information bits in said transmitter (TM) and transmitting said parity bits to said receiver (RC);

c) reordering said corrected information bits in said receiver (RC-) by using the same reordering pattern (REORD-A, REORD-B, REORD-C) that was selected in said receiver for reordering; and d) performing error correction of said reordered information bits (IB) by using said transmitted parity bits in said receiver (RC);

e) said steps a") and a)–d) being repeatedly performed and a new reordering pattern being respectively selected for reordering said information bits in said transmitter and receiver when errors which cannot be further corrected using said parity bits present in said receiver at any time are found in said respectively corrected information bits after step d).

55. A packet transmission system for data packet transmission and for data correction of said data packets (P) having erroneous information bits due to errors caused on a transmission link (TL) between a data packet transmitter (TM) and a data packet receiver (RC); said transmitter (TM) comprising:

a4) a transmitter information bit register (IB-T) for storing the information bits of said data packet;

a3) transmitter reordering pattern storage means (RPSM-T) for storing a plurality of reordering patterns (REORD-A, REORD-B, REORD-C);

a1) transmitter reordering means (RM-T) for reordering said stored information bits (IB) of said data packet (P) by using a selected reordering pattern of said transmitter reordering pattern storage means, a4) said transmitter reordering means (RM-T) being adapted to select from said transmitter reordering pattern storage means a new reordering pattern (REORD-A, REORD-B, REORD-C) for reordering said stored information bits each time a parity bit request is transmitted by said receiver; and a2) parity bit generating means (PBGM) for generating parity bits (PA, PB, PC) for said reordered information bits and for transmitting these parity bits to said receiver in response to said parity bit request; and said receiver (RC) comprising:

b5) a receiver information bit register (IB-R) for storing said information bits in said receiver;

b4) receiver reordering pattern storage means (RPSM-R) for storing the same reordering patterns (REORD-A, REORD-B, REORD-C) as in said transmitter;

b2) receiver reordering means (RM-T) for reordering said information bits present in said receiver information bit register (IB-R) by using a selected reordering pattern (REORD-A, REORD-B, REORD-C) of said receiver reordering pattern storage means, b6) said receiver reordering means (RM-T) being adapted to select said same new reordering pattern which is selected in said transmitter each time a parity bit request is issued in said receiver reordering pattern storage means;

b3) error correction means (ERM) for error correction of said information bits (IB) reordered by said receiver reordering means by using said parity bits (PA, PB, PC) respectively transmitted by said transmitter;

b8) error check means (ECM) for checking said information bits for errors;

b1) parity bit request means (PBRM) for transmitting parity bit requests to said transmitter, whenever errors which cannot be further corrected by using said parity bits present in said receiver at any time are still found by said error check means in said corrected information bits after error correction by said error correction means.

56. A method for correcting information bits (IB) of a data packet (P), which have been subjected to errors due to a transmission of said data packet (P) between a transmitter (TM) and a receiver (RC), wherein the original information bits (IB) of said data packet (P) before transmission are reordered at said transmitter (TM) using a selected reordering pattern (REORD-A, REORD-B, REORD-C) in response to a parity bit request issued by said receiver (RC), a set of parity bits (PA, PB, PC) for said reordered original information bits are derived and transmitted by said transmitter (TM) to said receiver (RC), said erroneous information bits received at said receiver (RC) are reordered using said selected reordering pattern (REORD-A, REORD-B, REORD-C) and said reordered erroneous information bits (IB) are corrected at said receiver (RC) using said set of parity bits (PA, PB, PC) received from said transmitter (TM), said method comprising the following specific steps:

a1) transmitting (S11) a first parity bit request from said receiver to said transmitter, when an error checking detects (S6, S7) uncorrectable errors in said transmitted information bits; and a2) reordering (S12) said information bits at said transmitter according to said selected first reordering pattern (REORD-A) and deriving and transmitting (S13) to said receiver said first parity bits (PA) for said reordered information bits;

a) reordering (S14) at said receiver said information bits according to said first selected reordering pattern (REORD-A);

b) performing (S14) at said receiver a first error correction of said reordered information bits with said first parity bits (PA) generated at and transmitted from said transmitter for said original information bits reordered according to said first selected reordering pattern (REORD-A);

c) inverse reordering (S14) of said error corrected information bits at said receiver using an inverse of said first selected reordering pattern ($\overline{\text{REORD - A}}$);

d1) transmitting (S18) a second parity bit request from said receiver to said transmitter, when an error checking detects (S15) uncorrectable errors in said error-corrected information bits; and d2) reordering (S19) said original information bits at said transmitter according to said selected second reordering pattern (REORD-B) and deriving (S19) and transmitting (S20) to said receiver said second parity bits (PB) for said reordered information bits;

d) reordering (S21) at said receiver said error-corrected information bits according to said second selected reordering pattern (REORD-B);

e) performing (S21) at said receiver a second error correction of said reordered information bits with said second parity bits (PB) generated at and transmitted from said transmitter for said original information bits reordered according to said second selected reordering pattern (REORD-B);

f) inverse reordering (S21) of said error corrected information bits at said receiver using an inverse of said second selected reordering pattern ($\overline{\text{REORD -B}}$); and g) when an error checking (S22) detects further errors in said error corrected information bits after step f), recursively repeating (S25, S26, S29, S30; S21, S22) at said receiver said steps a)–c) and said steps d)–f) until no further improvements of errors is detected (S29).

* * * * *